(12) United States Patent
Miyake et al.

(10) Patent No.: US 6,844,068 B1
(45) Date of Patent: Jan. 18, 2005

(54) SLIDABLY MOVABLE MEMBER AND METHOD OF PRODUCING SAME

(75) Inventors: Shojiro Miyake, Tokyo (JP); Yoshiteru Yasuda, Yokohama (JP); Makoto Kano, Yokohama (JP); Yutaka Mabuchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/545,181

(22) Filed: Apr. 7, 2000

(30) Foreign Application Priority Data

Apr. 9, 1999 (JP) .......................................... 11-102205

(51) Int. Cl.$^7$ ............................................... F16N 15/02
(52) U.S. Cl. .................. 428/408; 280/86.753; 292/137; 403/135; 428/141; 428/142; 428/174; 428/217; 428/336; 428/698
(58) Field of Search ................................ 428/408, 217, 428/141, 142, 174, 336, 698, 701, 457, 469; 292/137; 403/135; 280/86.753

(56) References Cited

U.S. PATENT DOCUMENTS

| | | | |
|---|---|---|---|
| 4,538,929 A | | 9/1985 | Ehrentraut et al. |
| 4,554,208 A | * | 11/1985 | MacIver et al. |
| 4,755,426 A | * | 7/1988 | Kokai et al. ................. 428/336 |
| 4,783,368 A | * | 11/1988 | Yamamoto et al. .......... 428/408 |
| 4,834,400 A | | 5/1989 | Lebeck |
| 4,974,498 A | * | 12/1990 | Lemelson |
| 5,077,990 A | * | 1/1992 | Plath |
| 5,190,824 A | * | 3/1993 | Itoh ........................... 428/408 |
| 5,205,188 A | * | 4/1993 | Repenning et al. |
| 5,237,967 A | * | 8/1993 | Willermet et al. |
| 5,249,554 A | * | 10/1993 | Tamor et al. |
| 5,466,431 A | * | 11/1995 | Dorfman et al. ............. 423/446 |
| 5,630,953 A | | 5/1997 | Klink |
| 5,735,769 A | | 4/1998 | Takemura et al. |
| 5,843,571 A | * | 12/1998 | Sho ............................ 428/336 |
| 6,059,460 A | | 5/2000 | Ono et al. |
| 6,095,690 A | | 8/2000 | Niegel et al. |
| 6,237,441 B1 | * | 5/2001 | Nishioka et al. |
| 6,523,456 B1 | | 2/2003 | Kobayashi et al. |
| 6,524,212 B2 | | 2/2003 | Ushijima et al. |
| 2002/0090155 A1 | | 7/2002 | Ushijima et al. |
| 2002/0148430 A1 | | 10/2002 | Kano et al. |
| 2003/0128903 A1 | | 7/2003 | Yasuda et al. |
| 2003/0162672 A1 | | 8/2003 | Shirahama et al. |

FOREIGN PATENT DOCUMENTS

| | | |
|---|---|---|
| EP | 0 529 327 A1 | 3/1993 |
| EP | 731190 * | 3/1995 |
| EP | 0 661 470 A2 | 7/1995 |
| JP | 6-294307 * | 10/1994 |
| JP | 7-090553 * | 4/1995 |
| JP | 2000-504089 A | 4/2000 |
| WO | WO 92/02602 A1 | 2/1992 |
| WO | WO 93/21289 A1 | 10/1993 |
| WO | WO 01/05917 A1 | 1/2001 |

OTHER PUBLICATIONS

JIS Japanese Industrial Standard; "Surface Roughness—Definitions and Designation"; JIS B 0601; 1994. (w/Translation).
JIS Japanese Industrial Standard; "Chromium Molybdenum Steels"; JIS G 4105; 1979; (w/Translation).
JIS Japanese Industrial Standard; "High Carbon Chromium Bearing Steels"; JIS G 4805; 1999; (w/Translation).

(List continued on next page.)

*Primary Examiner*—Archene Turner
(74) *Attorney, Agent, or Firm*—Foley & Lardner LLP

(57) ABSTRACT

A slidably movable member such as an adjusting shim used in a valve operating mechanism of an internal combustion engine of an automotive vehicle. The slidably movable member is used in contact with lubricating oil and comprises a substrate. A hard carbon-based film is coated on a surface of the substrate. The hard carbon-based film has a surface section which contains at least one of nitrogen and oxygen in an amount ranging from 0.5 to 30 at % and/or hydrogen in an amount of not more than 10 at %.

22 Claims, 3 Drawing Sheets

OTHER PUBLICATIONS

JIS Japanese Industrial Standard; "Vickers Hardness Test—Test Method"; JIS Z 2244; 1998; (w/Translation).

Patent Abstracts of Japan, vol. 1996, No. 09, Sep. 30, 1996, JP 08-128448, May 21, 1996.

"Geometrical Product Specifications (GPS)—Surface Texture: Profile Method—Terms, Definitions and Surface Texture Parameters," International Standard, ISO 4287, TC 213 (1997), pp. 1-25.

Kano et al., "Friction Property of Hard Carbon Film in Engine Oil", Japan Tribology Congress 1999, 5, Tokyo, Proceeding pp. 11 and 12.

Kano et al, "The Effect of ZDDP and MODTC Additives on Friction Properties of DLC and Steel Cam Follower in Engine Oil", Abstracts of Papers from $2^{nd}$ World Tribology Congress, Sep. 3-7, 2001, p. 342.

Japanese Industrial Standard, "Carbon Steels for Machine Structural Use", Japanese Standards Association, JIS G 4051, 1979, pp. 1-10.

Japanese Industrial Standard, "Chromium Steels", Japanese Standards Association, JIS G 4104, 1979, pp. 1-9.

"Standard Test Method for Separation of Representative Aromatics and Nonaromatics Fractions of High-Boiling Oils by Elution Chromatography", ASTM Designation: D 2549—91 (Reapproved 1995), pp. 895-900.

International Standard, "Petroleum products—Determination of Base Number—Perchioric Acid Potentiometric Titration Method", ISO 3771, Second Edition Aug. 15, 1994, pp. 1-8.

"Assessment of $2^{nd}$ to $5^{th}$ Order Irregularities of Surface Configuration by Means of Sections of Surfaces Definitions Relating to Reference System and Dimensions," DIN 4762, UDC 621-288:001.4 (Aug. 1960), pp. 1-4.

Engine Oil Viscosity Classification—SAE J300 revised Apr. 1997, p. 133.

API Motor Oil Guide, Which Oil is Right for You, American Petroleum Institute, Copyright 2002.

Dr. Marx, "Surfaces and Contact Mechanics", XP-002233233, Google, Retrieved from the Internet Mar. 3, 2003, pp. 1-18.

Patent Abstracts of Japan, vol. 2000, No. 09, Oct. 13, 2000, JP 2000-170768, Jun. 20, 2000.

Patent Abstracts of Japan, vol. 2000, No. 01, Jan. 31, 2000, JP 11-287329, Oct. 19, 1999.

Database WPI, Nov. 28, 2000, Derwent Publications, Ltd., AN 2000640583, XP002240184, JP 2000-327484.

* cited by examiner

SLIDABLY MOVABLE MEMBER AND METHOD OF PRODUCING SAME

BACKGROUND OF THE INVENTION

This invention relates to improvements in a slidably movable member having a hard carbon-based film which is low in friction, and more particularly to the slidably movable member having the hard carbon-based film suitable to be used in a condition to be in contact with engine lubricating oil, transmission oil or the like.

Hitherto, formation of hard carbon-based films have been proposed and put into practical use. The hard carbon-based films are formed of carbon-based materials such as amorphous carbon (a-C), a hydrogen-containing amorphous carbon (a-C:H), i-carbon (i-C) and diamond like carbon (DLC). The carbon-based films are usually formed by a plasma enhanced chemical vapor deposition (CVD) process in which hydrocarbon gas is plasma-decomposed to form the carbon-based film, or by an ion beam vapor deposition process using carbon and hydrocarbon ions. The thus formed carbon-based film has a high surface hardness and a high surface smoothness, and a high wear-resistance. Additionally, the carbon-based film is low in friction coefficient owing to solid lubricating characteristics, thereby exhibiting a low friction characteristics. The carbon-based film has a friction coefficient of about 0.1 under the condition of no lubrication, whereas a normal steel having a smooth surface has a friction coefficient ranging from 0.5 to 1.0 under the condition of no lubrication.

The hard carbon-based films have been presently applied to slidably movable members or parts to be used in a condition of no lubrication, for example, cutting tools such as a blade of a drill, processing jigs for the cutting tool, metal dies for plastic working, valve cocks and capstan rollers. Additionally, machine parts (such as those of an internal combustion engine) sidably movable in lubricating oil have been increasingly required to be reduced in mechanical loss from the viewpoints of energy saving and environmental protection. Particularly, such machine parts have been required to be lowered in friction by using the above-discussed hard carbon-based film having the solid lubricating characteristics in case that they are used in a section which is in a severe frictional condition causing a high friction loss.

SUMMARY OF THE INVENTION

In this regard, in case that a slidably movable member is coated with the above-mentioned hard carbon-based film and used to be slidably moved in engine lubricating oil, transmission oil or the like, a low friction characteristics can be obtained to some extent owing to the smoothness of the hard carbon-based film. However, it has been revealed, as a problem, that the slidably movable member coated with the hard carbon-based film is generally equal in low friction characteristics to other slidably movable members coated with hard films having no solid lubricating characteristics, such as those formed by ion plating of titanium nitride (TiN) or chromium nitride (CrN). In other words, it has been revealed, as a problem, that the slidably movable member coated with the conventional carbon-based film is generally equal in low friction characteristics in lubricating oil to slidably movable members coated with the film having no solid lubricating characteristics, and the generally same surface roughness, or to superfinished steel members, even though they coated with the conventional carbon-based film have the solid lubricating characteristics.

More specifically, for example, when three steel balls having a ⅜ inch diameter are pushed onto the hard carbon-based film of diamond like carbon under a load of 1 kgf in lubricating oil and slid at a relative speed of 0.03 m/sec., the hard-carbon based film of diamond like carbon exhibits a friction coefficient ranging from 0.08 to 0.12 which is the generally same as that of the ion-plated chromium nitride (CrN) film or that of a steel material having the generally same surface roughness and provided with no hard coating treatment.

In addition, slidably movable members or parts coated with molybdenum disulfide ($MoS_2$ or polytetrafluoroethylene (PTFE) having solid lubricating characteristics have been put into practical use in order to realize a low friction characteristics having a friction coefficient $\mu$ lower than 0.07 in lubricating oil such as engine lubricating oil or transmission oil. However, in case that such conventional slidably movable members or parts are used in further severe conditions and under a high bearing pressure, they are insufficient in wear resistance so that a necessary performance of wear resistance may be achieved only at an initial period in service but cannot be maintained for a long period of time in service.

It is an object of the present invention to provide an improved slidably movable member which can effectively overcome drawbacks encountered in conventional slidably movable members which are used in contact with lubricating oil.

Another object of the present invention is to provide an improved slidably movable member which is high in wear resistance even in a condition to be in contact with lubricating oil, throughout a long period of time in service.

A further object of the present invention is to provide an improved slidably movable member whose solid lubricating characteristics is effective even in lubricating oil so as to exhibit a low friction characteristics having a friction coefficient $\mu$ of not higher than 0.07.

A first aspect of the present invention resides in a slidably movable member used in contact with lubricating oil. The slidably movable member comprises a substrate. A hard carbon-based film is coated on a surface of the substrate. The hard carbon-based film has a surface section which contains at least one of nitrogen and oxygen in an amount ranging from 0.5 to 30 at %.

A second aspect of the present invention resides in an adjusting shim used in a valve operating mechanism of an internal combustion engine. The adjusting shim comprises a substrate. A hard carbon-based film is coated on a surface of the substrate. The hard carbon-based film has a surface section which contains at least one of nitrogen and oxygen in an amount ranging from 0.5 to 30 at %.

A third aspect of the present invention resides in a slidably movable member used in contact with lubricating oil. The sidably movable member comprises a substrate. A hard carbon-based film is coated on a surface of the substrate. The hard carbon-based film having a surface section which contains hydrogen in an amount of not more than 10 at %.

A fourth aspect of the present invention resides in a slidably movable member used in contact with lubricating oil. The sidably movable member comprises a substrate. A hard carbon-based film is coated on a surface of the substrate. The hard carbon-based film having a surface section which contains at least one of nitrogen in an amount ranging from 0.5 to 30 at %, oxygen in an amount ranging from 0.5 to 30 at %, and hydrogen in an amount of not more than 10 at %.

A fifth aspect of the present invention resides in a method of producing a slidably movable member used in contact with lubricating oil. The producing method comprises (a) preparing a substrate; (b) coating a hard carbon-based film on a surface of the substrate by a chemical vapor deposition process; and (c) causing a surface section of the hard carbon-based film to contain at least one of nitrogen and oxygen in an amount ranging from 0.5 to 30 at % by one of a plasma treatment and an ion implantation process.

A sixth aspect of the present invention resides in a method of producing a slidably movable member used in contact with lubricating oil. The producing method comprises (a) preparing a substrate; and (b) coating a hard carbon-based film on a surface of the substrate by one of a carbon ion beam process, a thermal chemical vapor deposition process, an ion plating process, and a sputtering process, to cause a content of hydrogen in a surface section of the hard carbon-based film to fall within a range of not more than 10 at %.

DETAILED DESCRIPTION OF THE INVENTION

According to the present invention, a slidably movable member used in contact with lubricating oil comprises a substrate. Additionally, a hard carbon-based film is coated on a surface of the substrate. The hard carbon-based film is a film whose main component is carbon. The hard carbon-based film has a surface section which contains at least one of nitrogen and oxygen in an amount ranging from 0.5 to 30 at % (atomic percent) and/or hydrogen in an amount of not more than 10 at %. The surface section of the hard carbon-based film includes a surface of the hard carbon-based film. More specifically, the hard carbon-based film has a thickness ranging from 1 to 10 $\mu$m, in which the thickness of the surface section is $\frac{1}{10}$ of that of the surface section. Accordingly, at least the surface section of the hard carbon-based film contains nitrogen and/or oxygen in the above-mentioned amount. It will be understood that nitrogen and/or oxygen may be contained in the above-mentioned amount in the hard carbon-based film other than the surface section.

In the thus arranged slidingly movable member having hard carbon-based film whose surface section contains at least one of nitrogen and oxygen in an amount ranging from 0.5 to 30 at %, a large amount of polar groups are present at the surface of the hard carbon-based film, and therefore oiliness agents contained in lubricating oil are liable to be physically or chemically adsorbed at the surface of the hard carbon-based film. As a result, a low friction characteristics can be provided to the hard carbon-based film so that the hard carbon-based film exhibits a low coefficient of friction $\mu$ of not higher than 0.07. In this regard, if the content (amount) of nitrogen and/or oxygen in the surface section of the hard carbon-based film is less than 0.5 at %, there is a tendency that the above-mentioned low friction characteristics in lubricating oil cannot be realized. In contrast, if the content exceeds 30 at %, wear resistance under a high bearing pressure is insufficient. Preferably, the content of nitrogen and/or oxygen is within a range of from 4 to 20 at %, which effectively provides a low friction characteristics in lubricating oil without degrading a wear resistance and a smoothness of the hard carbon-based film. The content of nitrogen and/or oxygen is measured by a X-ray photoelectron spectra (XPS) "ESCA-5600" produced by PHI (Physical Electronics, Inc.).

The slidably movable member is produced by a method comprising (a) preparing a substrate; (b) coating a hard carbon-based film on a surface of the substrate by a chemical vapor deposition process; and (c) causing a surface section of the hard carbon-based film to contain at least one of nitrogen and oxygen in an amount ranging from 0.5 to 30 at % by one of a plasma treatment and an ion implantation process.

Figure 2:
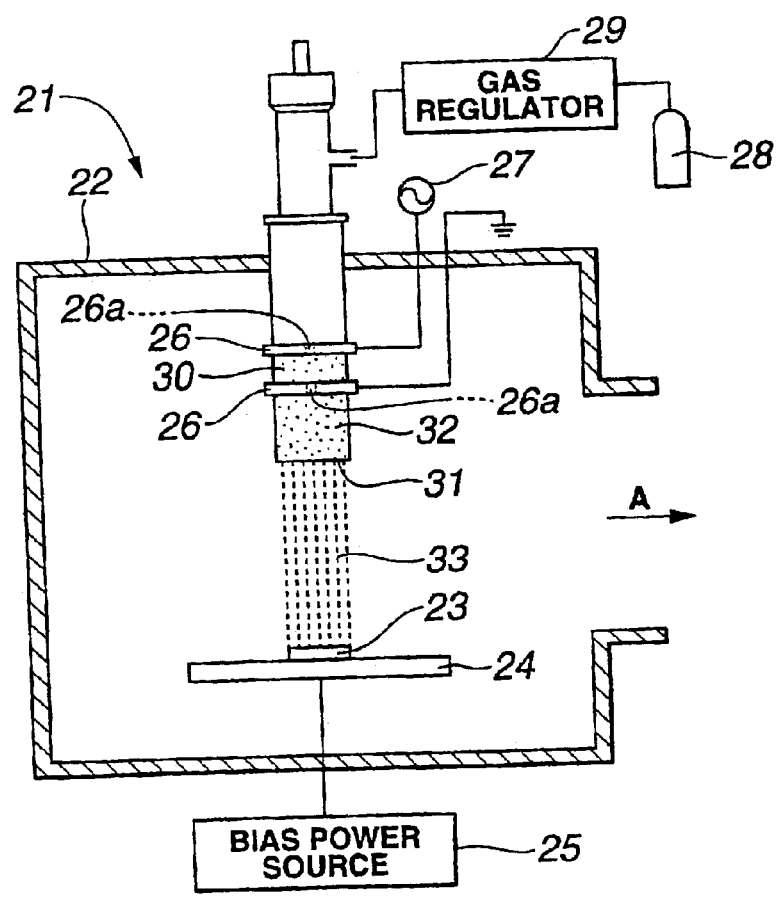
FIG. 2 is an explanatory sectional view of a plasma treatment apparatus used for accomplishing a plasma treatment on a hard carbon-based film formed on a substrate, so as to produce the slidably movable member according to the present invention.

Under a plasma treatment, nitrogen and/or oxygen are supplied to be contained in the surface section of the hard carbon-based film. The plasma treatment is carried out by using a plasma treatment apparatus 21 as shown in FIG. 2. The plasma treatment apparatus 21 includes a vacuum vessel 22. A substrate holder 24 is disposed inside the vacuum vessel 22 and located at a lower position in order to support the substrate (coated with the hard carbon-based film) 23 constituting the sidably movable member 1. The substrate holder 24 is electrically connected to a bias power source 25. RF electrodes 26 are provided above the substrate holder 24 and electrically connected to a RF power source 27.

A plasma forming gas contained in a gas bomb 28 is supplied through a gas regulator 29 to the RF electrodes 26 each having a central opening 26a, so that plasma is formed between the electrodes 26 under RF discharge. Then, ion 32 is formed in an aperture electrode 31 so that radical ion beam 33 reaches the surface section of the hard carbon-based film formed at the surface of the substrate 23. Consequently, the plasma forming gas is contained in the surface section of the hard carbon-based film. Evacuation of the vacuum vessel 22 is accomplished in a direction indicated by an arrow A by an evacuator (not shown). Such a plasma treatment is accomplished, for example, under a condition where a RF input power is within a range of from 10 to 100 W; a flow rate of the plasma forming gas is within a range of from 5 to 50 cc/min.; and a bias voltage applied from the bias power source 25 is within a range of from −250 to +250 V.

While the plasma treatment has been discussed to cause the surface section of the hard carbon-based film to contain nitrogen and/or oxygen, it will be understood that an ion implantation may be used for the same purpose.

Otherwise, the low friction characteristics in lubricating oil can be obtained by controlling the content or concentration of hydrogen at a level of not more than 10 at % in the surface section of the hard carbon-based film. Although measurement of content of hydrogen in the surface section is difficult, the content can be readily estimated from conditions where formation of the hard carbon-based film is accomplished. Accordingly, such a low content of hydrogen can be realized by forming the hard carbon-based film of amorphous carbon by a carbon ion beam process or the like in which hydrocarbon plasma is not used at least during formation of the hard carbon-based film, or by forming the hard carbon-based film of a diamond polycrystal by a thermal chemical vapor deposition (CVD) process. Additionally, such a low content of hydrogen can be realized by forming the hard carbon-based film by an ion plating process, or by a sputtering process. With the thus formed hard carbon-based film, a large amount of polar groups are present at the surface of the hard carbon-based mm, and therefore oiliness agents contained in lubricating oil are liable to be physically or chemically adsorbed at the surface of the hard carbon-based film. It will be understood that hydrogen may be contained in the above-mentioned amount in the hard carbon-based film other than the surface section.

Further, it is preferable that the hard carbon-based film has a surface roughness Ra of not higher than 0.1 μm, so that the hard carbon-based film can have a low friction characteristics and a low aggressivity against an opposite member to which the slidably movable member is contacted. The surface roughness Ra is measured according to JIS (Japanese Industrial Standard) B 0601. Additionally, it is also preferable that the hard carbon-based film has a surface hardness Hv (by Vickers hardness test according to JIS Z 2244) of not lower than 1000. It is also preferable that the hard carbon-based film has a thickness ranging from 1 to 10 μm. If the thickness is lower than 1 μm, the hard carbon-based film is insufficient in adherence strength. If the thickness exceeds 10 μm, residual stress in the hard carbon-based film is high so that the hard carbon-based film may naturally peel off. The thickness of the hard carbon-based film is microscopically measured.

Figure 1:
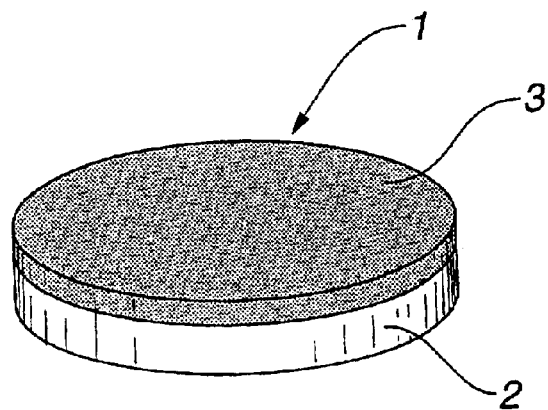
FIG. 1 is an explanatory perspective view of an embodiment (adjusting shim) of a sidably movable member according to the present invention.

The slidably movable member 1 is preferably used as an adjusting shim in the form shown in FIG. 1. The adjusting shim is, for example, mounted on a valve lifter for an engine valve (intake or exhaust valve) of an internal combustion engine of an automotive vehicle. The valve lifter forms part of a valve operating mechanism for operating the engine valve under drive of the engine. The adjusting shim is in slidable contact with a camshaft in a condition to be coated with lubricating oil. The adjusting shim functions to adjust a valve clearance of the engine valve.

EXAMPLES

The present invention will be more readily understood with reference to the following Examples in comparison with Comparative Examples; however, these Examples are intended to illustrate the invention and are not to be construed to limit the scope of the invention.

Example 1

First, a disc-shaped substrate 2 made of ceramic (silicon nitride) was prepared to have a dimension of a 30 mm diameter and a 4 mm thickness, as shown in FIG. 1. A diamond polycrystal film (synthesized in gas phase) having a thickness of 10.0 μm was deposited on an upper surface of the substrate 2 by a thermal CVD process to form a hard carbon-based film 3 as shown in FIG. 1. The surface section of the hard carbon-based film 3 was estimated to contain hydrogen in an amount less than 10 at %. Subsequently, the surface of the diamond polycrystal film or hard carbon-based film 3 was ground to be finished by a diamond wheel or abrasive grain thereby obtaining a surface roughness Ra of 0.05 μm. As a result, a sidably movable member 1 as shown in FIG. 1 was produced.

Example 2

First, a disc-shaped substrate 2 made of carburized steel (SCM415, chromium molybdenum steel, according to JIS G 4105) was prepared to have a dimension of a 30 mm diameter and a 4 mm thickness, as shown in FIG. 1. A super finishing was made on the upper surface of the substrate 2 to have a surface roughness Ra of 0.04 μm. Thereafter, a hard carbon-based film 3 was coated on the upper surface of the substrate 2 by an ion plating process using carbon ion beam, as shown in FIG. 1. The surface section of the hard carbon-based film 3 was estimated to contain hydrogen in an amount less than 10 at %. As a result, a slidably movable member 1 as shown in FIG. 1 was produced to have a surface roughness Ra of 0.09 μm without being subjected to finishing after formation of the hard carbon-based film 3.

Example 3

A slidably movable member 1 of Example 3 was produced similarly to Example 2 with the exception that lapping was made on the upper surface of the slidably movable member 1 so that the slidably movable member has a surface roughness Ra of 0.03 μm.

Example 4

First, a disc-shaped substrate 2 made of carburized steel (according to JIS SCM415) was prepared to have a dimension of a 30 mm diameter and a 4 mm thickness, as shown in FIG. 1. A super finishing was made on the upper surface of the substrate 2 to have a surface roughness Ra of 0.04 μm. Thereafter, a diamond like carbon (DLC) film or hard carbon-based film 3 was formed on the upper surface of the substrate 2 by a plasma enhanced CVD process using hydrocarbon gas. The surface section of the hard carbon-based film 3 was estimated to contain hydrogen in an amount more than 10 at %. Subsequently, the substrate 2 with the DLC film was put on the substrate holder 24 in the plasma treatment apparatus 21 and subjected to an oxygen plasma treatment to cause the surface section of the hard carbon-based film 3 to contain oxygen under the following conditions: the RF input power was 50 W; the oxygen gas flow rate was 10 cc/min.; and the bias voltage was −100 V. As a result, a slidably movable member 1 as shown in FIG. 1 was produced to have the hard carbon-based film whose the surface section had an oxygen content of about 3.5 at %.

Example 5

The slidably movable member 1 of Example 3 was put on the substrate holder 24 in the plasma treatment apparatus 21 and subjected to an oxygen plasma treatment similar to that in Example 4. The hard carbon-based film 3 was estimated to contain hydrogen in an amount less than 10 at %. As a result, a slidably movable member 1 as shown in FIG. 1 was produced to have the hard carbon-based film whose surface section had an oxygen content of about 3.5 at %.

Example 6

The slidably movable member 1 of Example 1 was put on the substrate holder 24 in the plasma treatment apparatus 21 so that the diamond polycrystal film or hard carbon-based film 3 was subjected to a nitrogen plasma treatment to cause the surface section of the hard carbon-based film 3 to contain nitrogen, under conditions similar to those in Examples 4 and 5 with the exception that the oxygen gas flow rate was replaced with a nitrogen gas flow rate. The hard carbon-based film 3 was estimated to contain hydrogen in an amount less than 10 at %. As a result, a slidably movable member 1 of Example 6 was produced to have the hard carbon-based film 3 whose surface section had a nitrogen content of about 5.7 at %, as shown in FIG. 1.

Comparative Example 1

First, a disc-shaped substrate made of carburized steel (according to JIS SCM415) was prepared to have a dimension of a 30 mm diameter and a 4 mm thickness, as shown in FIG. 1. Grinding was made on the upper surface of the substrate to have a surface roughness Ra of 0.24 μm. Thereafter, the upper surface of the substrate 2 was subjected to a manganese phosphate treatment for forming a manganese phosphate coating. As a result, a slidably movable member of Comparative Example 1 as shown in FIG. 1 was produced.

Comparative Example 2

First, a disc-shaped substrate 2 made of carburized steel (according to JIS SCM415) was prepared to have dimensions of a 30 mm diameter and a 4 mm thickness, as shown in FIG. 1. Thereafter, super finishing was made on the upper surface of the substrate 2 to have a surface roughness Ra of 0.04 μm. As a result, a slidably movable member of Comparative Example 2 like that as shown in FIG. 1 was produced.

Comparative Example 3

The slidably movable member of Comparative Example 2 was subjected to anion plating process, in which the surface of the slidably movable member was coated with chromium nitride (CrN). As a result, a slidably movable member of Comparative Example 3 as shown in FIG. 1 was produced to have a chromium nitride film having a thickness of 2.0 μm and a surface hardness Hv of 1500.

Comparative Example 4

First, a disc-shaped substrate made of ceramic (silicon nitride) was prepared to have a dimension of a 30 mm diameter and a 4 mm thickness, as shown in FIG. 1. A diamond polycrystal film (synthesized in gas phase) having a thickness of 10.0 μm was deposited on an upper surface of the substrate by a thermal CVD process to form a hard carbon-based film like that as shown in FIG. 1. The hard carbon-based film 3 was estimated to contain hydrogen in an amount less than 10 at %. As a result, a slidably movable member of Comparative Example 4 as shown in FIG. 1 was produced to have a surface roughness Ra of 0.12 μm.

Comparative Example 5

First, a disc-shaped substrate made of carburized steel (according to JIS SCM415) was prepared to have a dimension of a 30 mm diameter and a 4 mm thickness, as shown in FIG. 1. Then, super finishing was made on the upper surface of the substrate to have a surface roughness Ra of 0.04 μm. Thereafter, a diamond like carbon (DLC) film was formed on the upper surface of the substrate by a plasma enhanced CVD process using hydrocarbon gas. The surface section of the hard carbon-based film was estimated to contain hydrogen in an amount more than 10 at %. As a result, a slidably movable member of Comparative Example 5 as shown in FIG. 1 was produced.

Comparative Example 6

First, a disc-shaped substrate made of carburized steel (according to JIS SCM415) was prepared to have a dimension of a 30 mm diameter and a 4 mm thickness, as shown in FIG. 1. Grinding was made on the upper surface of the substrate to have a surface roughness Ra of 0.20 μm. Thereafter, a hard carbon-based film was coated on the upper surface of the substrate by an ion plating process using carbon ion beam. The surface section of the hard carbon-based film was estimated to contain hydrogen in an amount less than 10 at %. As a result, a slidably movable member of Comparative Example 6 as shown in FIG. 1 was produced to have a surface roughness Ra of 0.25 μm Comparative Example 7

The slidably movable member of Comparative Example 6 was put on the substrate holder 24 in the plasma treatment apparatus 21 and subjected to an oxygen plasma treatment similar to that in Example 4. The surface section of the hard carbon-based film was estimated to contain hydrogen in an amount less than 10 at %. As a result, a slidably movable member of Comparative Example 7 as shown in FIG. 1 was produced to have the hard carbon-based film whose surface section had an oxygen content of about 40 at %.

The essential points of Examples and Comparative Examples are shown at the upper part of Table 1.

EXPERIMENT

Figure 3:
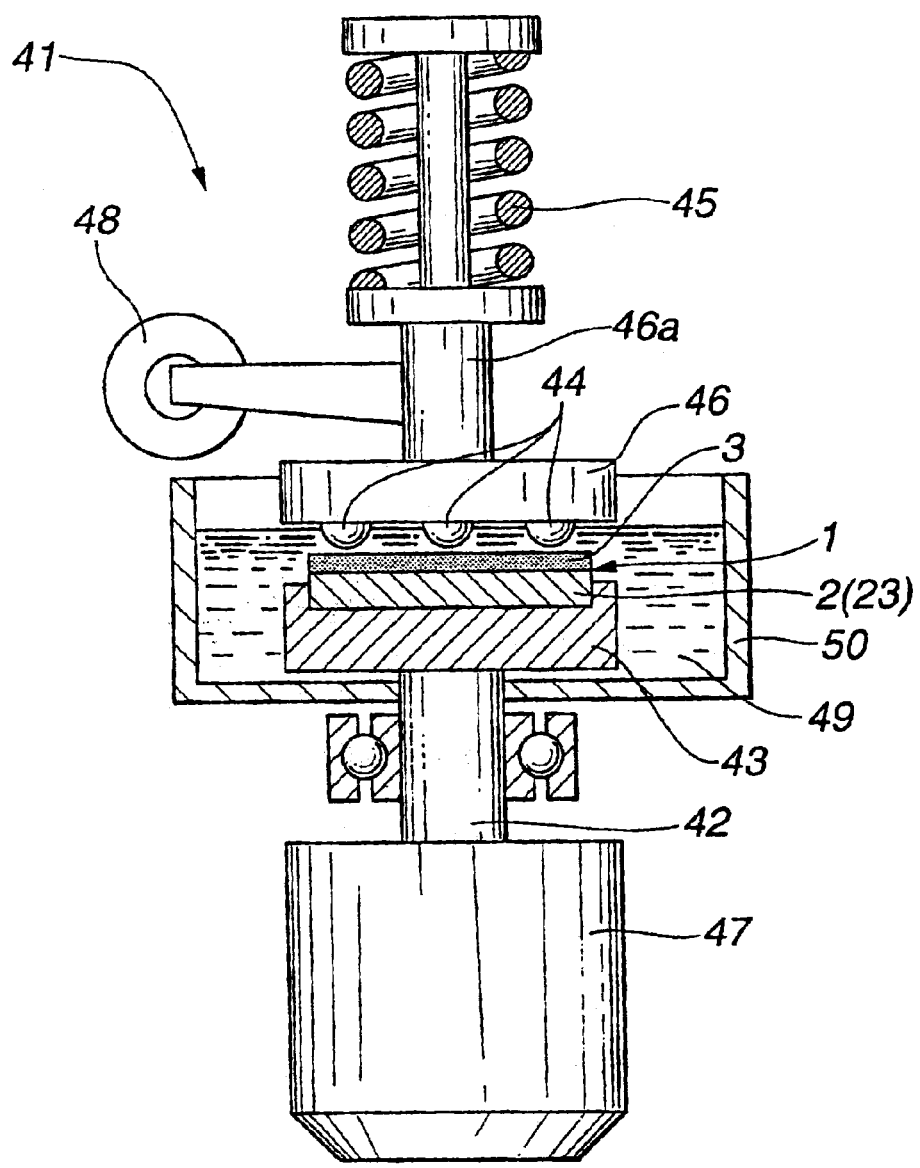
FIG. 3 is an explanatory sectional view of a friction tester for measuring a coefficient of friction of the sidably movable member according to the present invention.

In order to evaluate the performance of the slidably movable members according to the present invention, the coefficient of frictions of the slidably movable members were measured by using a pin-on-disc type friction tester 41 as shown in FIG. 3.

The friction tester 41 included a work table 43 which was rotatably supported through a rotatable shaft 42. Three steel balls 44 were fixedly supported by a ball holder 46, and located above the work table 43. Each steel ball 44 had a diameter of 3/8 inch and formed of a steel (SUJ2, high carbon chromium bearing steel, according to JIS G 4805). A sidably movable member (of Examples and Comparative Examples) was securely mounted, as a test piece, on the work table 43, so that the steel balls 44 were in slidable contact with the slidably movable member 1. The steel balls 44 were pressed onto the slidably movable member 1 at a load of 1.0 kgf by a spring 45, through a spring support 46a connected to the ball holder 46. The rotatable shaft 42 was directly connected to a motor 47 and rotated at a relative sliding speed ranging from 0.01 to 0.1 m/sec. to the steel balls 44. A load cell 48 was connected to the spring support 46a so as to measure a force due to a torque generated in accordance with a friction between the steel balls 44 and the sidably movable member 1. Additionally, an oil bath 60 was provided so that the slidably movable member 1 was able to be dipped in lubricating oil 49. The temperature of the lubricating oil 49 was controlled at about 80° C. by an oil temperature control unit (not shown). The lubricating oil was an engine lubricating oil (5W-30SG) available on the market. From the measured force due to the torque, a coefficient of friction 1 was calculated as shown in Table 1. In this experiment, two kinds of friction coefficients μ were measured, in which one friction coefficient μ was measured in the lubricating oil while the other friction coefficient μ was measured without the lubricating oil (or under no lubrication) so that no lubricating oil was supplied in the oil bath 50, under the same conditions in which the load applied to the three balls 44 was 1 kgf; and the relative sliding speed was 0.25 m/sec (250 r.p.m.).

As apparent from the test result shown in Table 1, the hard carbon-base films of Examples have a solid lubricating characteristics, and therefore the sidably movable members of Examples are low in friction coefficient as compared with the sidably movable members of Comparative Example 2 having no hard film and of Comparative Examples 1 and 3 having the hard film having no solid lubricating characteristics, under the condition of no lubrication.

However, under the condition of lubrication using the lubricating oil, the slidably movable member of Comparative Example 5 having the hard film of diamond like carbon having a hydrogen content higher than 10 at % is generally equivalent in friction coefficient to the slidably movable members of Comparative Examples 1 and 2 having no hard film. The friction coefficient is higher than 0.07 and therefore low in friction lowering effect even in the slidably movable member of Comparative Example 4 having the hard film of diamond polycrystal film (or amorphous carbon film) in case that the surface roughness Ra of the slidably movable member is over 0.10 μM.

In contrast, the slidably movable members of Examples 1 to 6 have a friction coefficient of not higher than 0.07. These sidably movable members are provided with the hard films having a hydrogen content lower than 10 at % and/or a specified nitrogen or oxygen content and having a surface roughness Ra of not higher than 0.01 μm. This reveals that these slidably movable members can be effectively lowered in friction loss even in lubricating oil.

Figure 4:
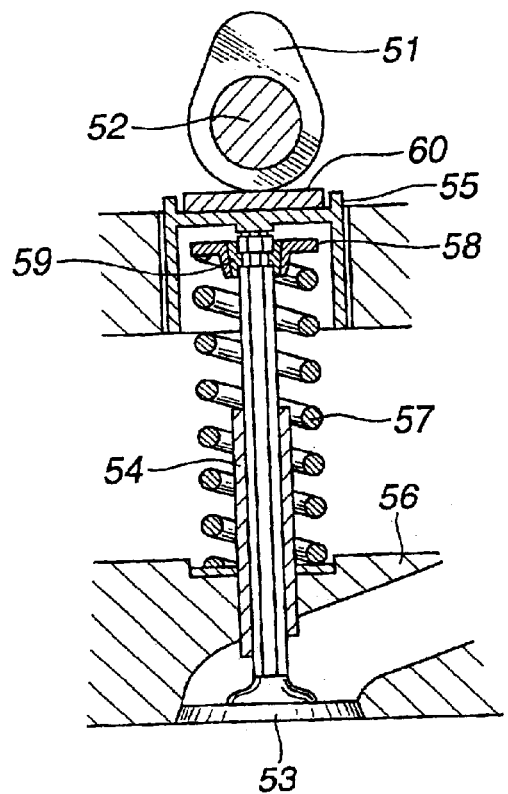
FIG. 4 is a fragmentary explanatory sectional view of an essential part of a valve operating mechanism of an internal combustion engine, in which the slidably movable member according to the present invention is used as an adjusting shim.

Furthermore, a friction loss torque (torque corresponding to a friction loss) was measured for a cam of a camshaft of a valve operating mechanism of an internal combustion engine in case that the slidably movable members of Example 5 and Comparative Examples 1, 2, 3 and 5 was used as an adjusting shim, by using the engine having the valve operating mechanism shown in FIG. 4.

In the valve operating mechanism shown in FIG. 4, the camshaft 52 having cams 51 was driven to rotate through a timing belt by the engine. An engine (intake or exhaust) valve 53 was sidably inserted in a valve guide 54. A valve lifter 55 was disposed at an upper end of the valve 53. A valve spring 57 was disposed between the valve lifter 55 and a cylinder head 56. The upper end section of the valve spring 57 is fixed to a stem section of the valve 53 by using a retainer 58 and a cotter 59. The valve spring 57 functioned to apply load to the valve 53 in a direction in which the valve 53 closes. The adjusting shim 60 was fitted in a depression formed at the top section of the valve lifter 55 and had such a thickness that a clearance of about 0.3 mm was formed between the cam 51 and the adjusting shim 60. Upon rotation of the camshaft 52, the cam 51 rotated and was in slidable contact with the adjusting shim 60 thereby making reciprocating movement of the valve 53.

The camshaft 52 was driven by a motor (not shown) through a torque meter (not shown) installed on an end section of the camshaft to measure a torque corresponding to a friction loss generated between the can 51 and the adjusting shim 60, under the following conditions: A rotational speed of the camshaft 52 was 3000 r.p.m. (corresponding to idling); a maximum load of the valve spring 57 was 50 kgf; an engine lubricating oil temperature was 80° C.; the cam 51 to which the adjusting shim 60 was slidably contacted had been subjected to superfinishing so as to have a surface roughness Ra of 0.05 μm. The result of measurement of the friction loss torque is shown in the form of a bar graph in FIG. 5 in which bars a, b, c, d and e respectively represent Example 5 (1.64 kg-cm), Comparative Example 1 (2.87 kg-cm), Comparative Example 2 (2.40 kg-cm), Comparative Example 3 (2.43 kg-cm) and Comparative Example 5 (2.28 kg-cm).

Figure 5:
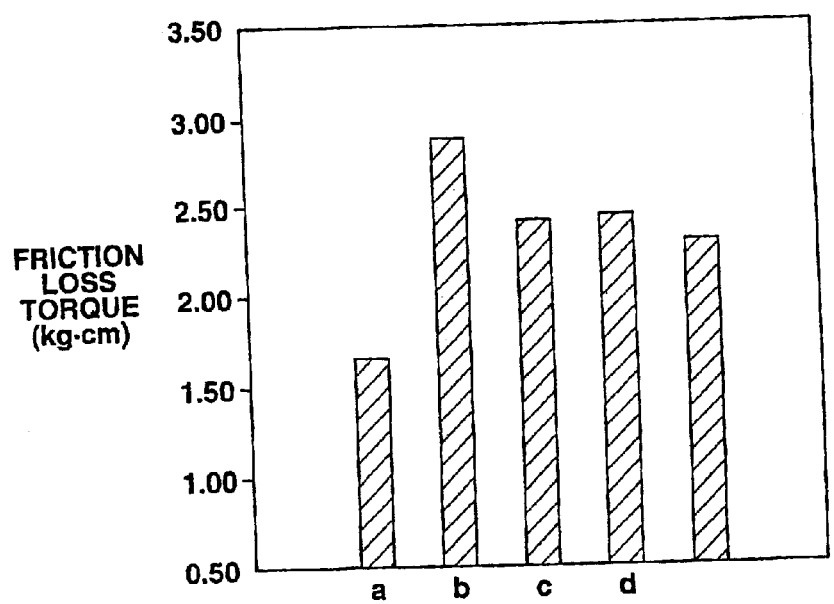
FIG. 5 is a graph showing test results of measurement of a friction loss torque, obtained by using the valve operating mechanism of FIG. 4.

As apparent from FIG. 5, the slidably movable member of Example is low in friction loss torque as compared with that of Comparative Examples even in case having the same surface roughness. This reveals that the slidably movable member according to the present invention is high in friction performance.

The entire contents of Japanese Patent Application P11-102205 (filed Apr. 9, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

TABLE 1

| Item | | Substrate | Hard film | Film forming process | Thickness (μm) | Hardness (Hv) |
|---|---|---|---|---|---|---|
| Example | 1 | Silicon nitride | Diamond polycrystal film | Thermal CVD | 10.0 | — |
| | 2 | Carburized steel | Hard carbon-based film (a-C) | Ion plating | 2.0 | 3500 |
| | 3 | Carburized steel | Hard carbon-based film (a-C) | Ion plating | 2.0 | 3500 |
| | 4 | Carburized steel | DLC film | Plasma enhanced CVD | 1.0 | 2500 |
| | 5 | Carburized steel | Hard carbon-based film (a-C) | Ion plating | 2.0 | 3500 |
| | 6 | Silicon nitride | Diamond polycrystal film | Thermal CVD | 10.0 | — |
| Compar. Example | 1 | Carburized steel | Manganese phosphate film | Chemical treatment | 10.0 | — |
| | 2 | Carburized steel | None | — | — | 720 |
| | 3 | Carburized steel | CrN film | Ion plating | 2.0 | 1500 |
| | 4 | Carburized steel | Diamond polycrystal film | Thermal CVD | 10.0 | — |
| | 5 | Carburized steel | DLC film | Plasma enchanced CVD | 1.0 | 2500 |
| | 6 | Carburized steel | Hard carbon-based film (a-C) | Ion plating | 2.0 | 3500 |
| | 7 | Carburized steel | Hard carbon-based film (a-C) | Ion plating | 2.0 | 3500 |

| Surface roughness Ra (μm) | Reference | Friction coefficient μ No lubrication | Friction coefficient μ In lubricating oil | Item | |
|---|---|---|---|---|---|
| 0.05 | 10 at % > hydrogen | 0.080 | 0.058 | 1 | Example |
| 0.09 | 10 at % > hydrogen | 0.110 | 0.065 | 2 | |
| 0.03 | 10 at % > hydrogen | 0.090 | 0.066 | 3 | |
| 0.04 | Oxygen plasma treatment, 3.5 at % oxygen, 10 at % < hydrogen | 0.098 | 0.056 | 4 | |

TABLE 1-continued

| | | | | | |
|---|---|---|---|---|---|
| 0.04 | Oxygen plasma treatment, 3.5 at % oxygen, 10 at % > hydrogen | 0.095 | 0.059 | 5 | |
| 0.05 | Nitrogen plasma treatment, 5.7 at % nitrogen, 10 at % > hydrogen | 0.080 | 0.049 | 6 | |
| 1.50 | — | 1.080 | 0.125 | 1 | Compar. |
| 0.04 | — | 0.480 | 0.096 | 2 | Example |
| 0.07 | — | 0.380 | 0.108 | 3 | |
| 0.12 | 10 at % > hydrogen | 0.090 | 0.075 | 4 | |
| 0.04 | 10 at % < hydrogen | 0.098 | 0.099 | 5 | |
| 0.25 | 10 at % > hydrogen | 0.125 | 0.085 | 6 | |
| 0.05 | Oxygen plasma treatment, 40 at % oxygen, 10 at % > hydrogen | Peeled off | 0.100 | 7 | |

What is claimed is:

1. A system comprising:
   a slidable member;
   lubricating oil for an internal combustion engine in contact with said slidable member, the lubricating oil containing one or more oiliness agents;
   wherein the slidable member includes a substrate selected from the group consisting of silicon nitride and a metal; and
   a hard carbon-based film coated on a surface of said substrate, said hard carbon-based film having been applied by a process that produces in the surface of the film a sufficient number of polar groups to adsorb the oiliness agents from the lubricating oil to a degree to produce a lowered coefficient of friction;
   wherein the hard carbon-based film has a coefficient of friction of not higher than 0.07 and wherein the hard carbon-based film has a surface roughness, Ra, of not higher than 0.1 μm.

2. A system as claimed in claim 1, wherein the process for applying the hard carbon-based film is selected from the group consisting of a process that provides at least one of (a) introducing into the surface of the film at least one of nitrogen and oxygen in an amount ranging from 0.5 to 30 at %; and (b) lowering the content of hydrogen in the surface of the film.

3. A system as claimed in claim 1, wherein the process for applying the hard carbon-based film is selected from the group consisting of a carbon ion beam process in which hydrogen plasma is not used at least during formation of the hard carbon-based film, a thermal chemical vapor deposition process which produces a diamond polycrystal, an ion plating process, and a sputtering process.

4. A system as claimed in claim 1, wherein the hard carbon-based film has a thickness of 1 to 10 μm.

5. A system as claimed in claim 1, wherein the substrate comprises steel.

6. A system comprising:
   a) a metal or silicon nitride substrate;
   b) an oiliness agent; and
   c) a hard carbon-based film formed on the substrate, the hard carbon-based film comprising a sufficient number of polar groups to adsorb the oiliness agent to a degree to produce a lowered coefficient of friction;
   wherein the hard carbon-based film has a coefficient of friction of not higher than 0.07 and wherein the hard carbon-based film has a surface roughness, Ra, of not higher than 0.1 μm.

7. A system according to claim 6, wherein said hard carbon-based film is a film selected from the group consisting of amorphous carbon and diamond like carbon.

8. A system according to claim 6, wherein the hard carbon-based film is a diamond polycrystal film.

9. A system according to claim 8, wherein the diamond polycrystal film is produced by thermal chemical vapor deposition.

10. A system according to claim 6, wherein the hard carbon-based film is produced by a process selected from the group consisting of a carbon ion beam process in which hydrogen plasma is not used during formation of the hard carbon-based film, a thermal chemical vapor deposition process which produces a diamond polycrystal, an ion plating process, and a sputtering process.

11. A system according to claim 6, wherein the substrate comprises steel.

12. A slidable member comprising the system of claim 6.

13. An adjusting shim for an internal combustion engine comprising a slidable member according to claim 12.

14. A motor vehicle comprising an adjusting shim according to claim 13.

15. A motor vehicle according to claim 14, wherein the adjusting shim is mounted on a valve lifter for an engine valve.

16. A motor vehicle according to claim 15, wherein the valve lifter forms part of a valve operating mechanism.

17. A motor vehicle according to claim 16, wherein the adjusting shim is arranged in slidable contact with a camshaft.

18. A motor vehicle according to claim 17, wherein a lubricating oil comprising the oiliness agent is present between a surface section of the hard carbon-based film of the adjusting shim and the camshaft.

19. A motor vehicle according to claim 15, wherein the adjusting shim is in contact with a lubricating oil comprising an oiliness agent.

20. A system comprising:
   a) a metal or silicon nitride substrate;
   b) a hard carbon-based film formed on the substrate, the hard carbon-based film having been applied by a process that produces in a surface of the film an increased concentration of polar groups; and
   c) an agent which adsorbs to the surface of the hard carbon-based film as a result of the presence of the polar groups and which thereby decreases the friction coefficient of the surface;
   wherein the hard carbon-based film has a coefficient of friction of not higher than 0.07 and wherein the hard carbon-based film has a surface roughness, Ra, of not higher than 0.1 μm.

21. A system comprising:
a) a metal or silicon nitride substrate having a film formed thereon;
b) a lubricant comprising an oiliness agent in contact with the film; and
c) said film comprising a hard carbon-based film formed on the substrate, the hard carbon-based film having (i) a surface roughness of not higher than 0.1 $\mu$m, (ii) a thickness of 1 to 10 $\mu$m, and (iii) comprising a sufficient number of polar groups to adsorb the oiliness agent to produce a coefficient of friction, Ra, of not higher than 0.07.

22. A system according to claim 21, wherein the hardness, Hv, of the hard carbon-based film is not lower than 1000.

* * * * *

UNITED STATES PATENT AND TRADEMARK OFFICE
CERTIFICATE OF CORRECTION

PATENT NO. : 6,844,068 B1
DATED : January 18, 2005
INVENTOR(S) : Shojiro Miyake et al.

It is certified that error appears in the above-identified patent and that said Letters Patent is hereby corrected as shown below:

<u>Title page,</u>
Item [73], Assignee, add:
-- Shojiro Miyake, Tokyo, Japan -- .

Signed and Sealed this

Thirteenth Day of September, 2005

JON W. DUDAS
*Director of the United States Patent and Trademark Office*